(12) United States Patent
Henryson et al.

(10) Patent No.: US 11,790,296 B1
(45) Date of Patent: Oct. 17, 2023

(54) MACHINE LEARNING PREDICTIVE MODELING WITH NATURAL LANGUAGE PROCESSING OF END-USER COMMUNICATIONS

(71) Applicant: Wells Fargo Bank, N.A., San Francisco, CA (US)

(72) Inventors: Stacy Renee Henryson, Clive, IA (US); Richard Penfil, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 308 days.

(21) Appl. No.: 17/121,408

(22) Filed: Dec. 14, 2020

(51) Int. Cl.
*G06Q 10/06* (2023.01)
*G06Q 10/0631* (2023.01)
*G06Q 30/016* (2023.01)
*G06N 20/00* (2019.01)
*G06Q 30/0201* (2023.01)
*G06F 18/214* (2023.01)

(52) U.S. Cl.
CPC ... *G06Q 10/06315* (2013.01); *G06F 18/2148* (2023.01); *G06N 20/00* (2019.01); *G06Q 30/016* (2013.01); *G06Q 30/0201* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 2014/0129536 A1* | 5/2014 | Anand | G06F 16/345 707/723 |
| 2017/0193534 A1* | 7/2017 | Marshall | G06F 16/9535 |
| 2019/0349273 A1* | 11/2019 | Rikovic Tabak | G06Q 10/063 |
| 2020/0126041 A1* | 4/2020 | Velusamy Sivasamy | G06Q 10/103 |

\* cited by examiner

*Primary Examiner* — Arif Ullah
(74) *Attorney, Agent, or Firm* — Foley & Lardner LLP

(57) ABSTRACT

Disclosed is an approach for training and applying predictive models that employ natural language processing in analyzing records with summary and resolution fields. A semi-supervised machine learning text model may be used to generate a category score for each record in a first dataset. The model may be generated using a training dataset comprising past records and categorization labels for each of the past records. The model may perform textual analytics on summary and resolution fields received as inputs and provide category scores as output. Dispositions may be assigned to each record in the first dataset based on a comparison of the category score to a category threshold. A second dataset may be generated with the records of the first dataset and assigned dispositions. A report comprising records and, for each record, disposition and category score may be generated.

18 Claims, 9 Drawing Sheets

MACHINE LEARNING PREDICTIVE MODELING WITH NATURAL LANGUAGE PROCESSING OF END-USER COMMUNICATIONS

TECHNICAL FIELD

The present disclosure relates to a machine learning platform for generating and applying predictive models that apply textual analytics to end-user communications.

BACKGROUND

Enterprises may receive feedback in a variety of forms and from a multitude of internal and external computing devices. Feedback records based on user complaints may be generated via software executing on various internal computing devices that track communications from external computing devices and record textual annotations and comments as well as metadata or other non-textual data (e.g., audio recordings of certain communications). Such complaint records may be transmitted to other internal computing devices for categorization or other evaluation. However, there may be no consistent and reliable contextualization of records.

SUMMARY

Various embodiments relate to a method comprising: receiving, by a computing device of a machine learning platform, a first dataset comprising a plurality of complaint records, each complaint record comprising a complaint summary field and a resolution field; applying, by the computing device to the first dataset, a classifier of a semi-supervised machine learning text model to generate, for each complaint record in the first dataset, a category score, the model (i) generated using a training dataset comprising past complaint records and categorization labels for each of the past complaint records, and (ii) configured to perform textual analytics on complaint summary and resolution fields received as inputs and provide category scores as output; assigning, by the computing device, a disposition to each complaint record in the first dataset based on a comparison of the category score to a category threshold; generating, by the computing device, a second dataset comprising the plurality of complaint records from the first dataset and, for each complaint record, the assigned disposition; generating, by the computing device, a report comprising the plurality of complaint records and, for each complaint record, the disposition and the category score.

Various embodiments relate to a machine learning platform comprising: a computing device configured to receive a first dataset comprising a plurality of text records, each text record comprising a summary field, a resolution field, and a first disposition, the computing device configured to assign each of the text records to at least one of a first subset and a second subset based on the first disposition and provide the first subset as output; a text processing circuit configured to analyze text fields using a semi-supervised machine learning text model that receives textual inputs and provides a categorical label as output; and an audit processing circuit configured to: receive the first subset from the computing device; provide each text record of the first subset to the text processing circuit; receive a categorical label for each text record from the text processing circuit; assign a second disposition to each text record based on the categorical label; determine whether the first disposition is different from the second disposition by comparing the first disposition and the second disposition; and generate a report comprising the first subset and, for each text record, the disposition, the category score, and an indication of whether the first disposition is different from the second disposition.

Various embodiments relate to non-transitory computer-readable storage media having instructions stored thereon that, when executed by at least one processing circuit, cause the at least one processing circuit to: receive a first dataset comprising a plurality of complaint records, each complaint record comprising a complaint summary field and a resolution field; apply a classifier of a semi-supervised machine learning text model to generate, for each complaint record in the first dataset, a category score, the model (i) generated using a training dataset comprising past complaint records and categorization labels for each of the past complaint records, and (ii) configured to perform textual analytics on complaint summary and resolution fields received as inputs and provide category scores as output; assign a disposition to each complaint record in the first dataset based on a comparison of the category score to a category threshold; generate a second dataset comprising the plurality of complaint records from the first dataset and, for each complaint record, the assigned disposition; generate a report comprising the plurality of complaint records and, for each complaint record, the disposition and the category score.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
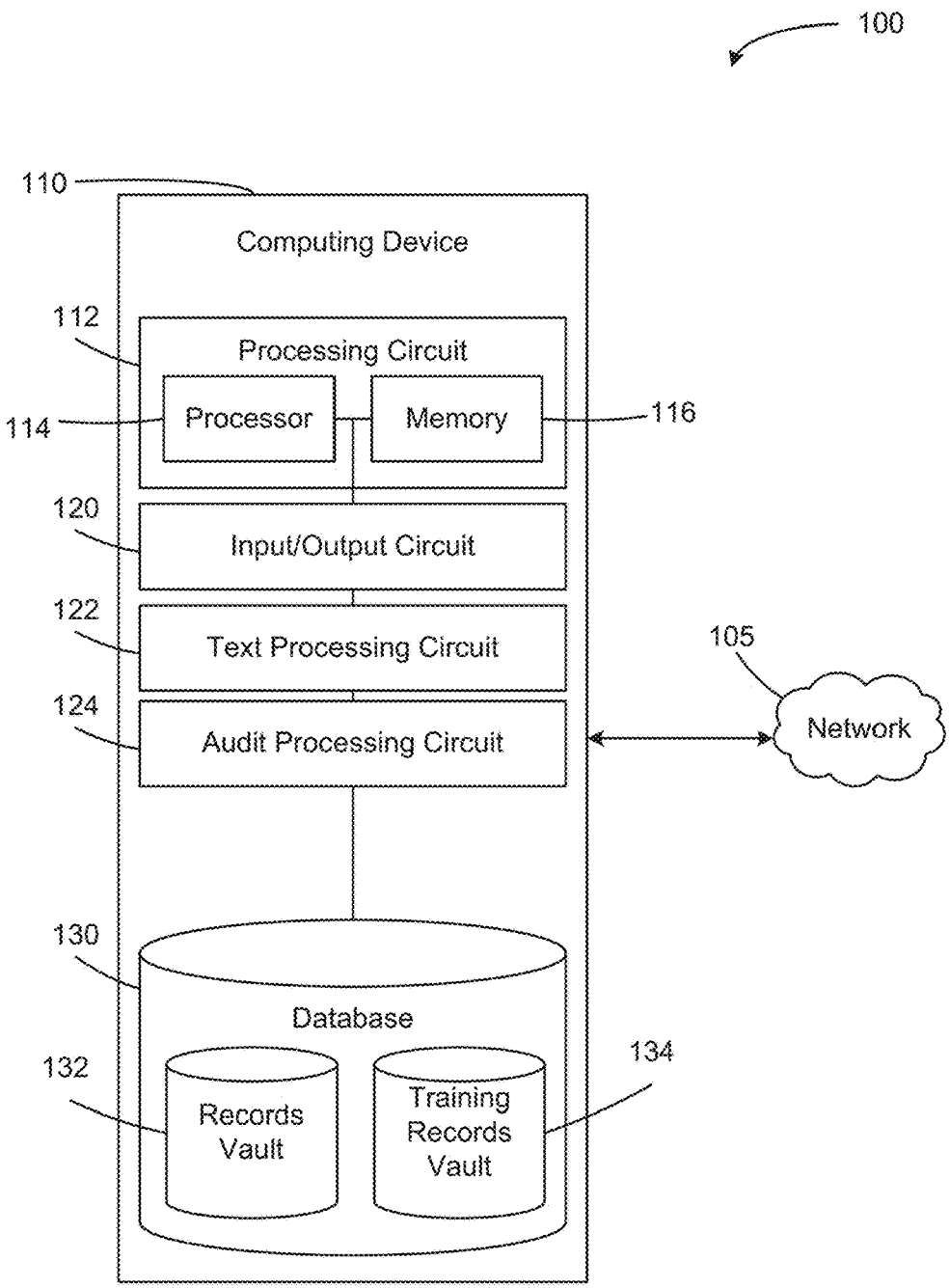
FIG. 1 is a component diagram of a machine learning platform for predictive modeling to be applied to fields of feedback records, according to various potential embodiments.

Referring generally to the figures, disclosed are various embodiments of systems and methods for a machine learning platform for generation and application of predictive models that apply textual analytics to various fields of text records. The systems and methods described herein may use machine learning modeling techniques that employ natural language processing to identify meanings in text records. In an example arrangement, the text records are complaint records that include a complaint summary text field and a complaint resolution text field.

The machine learning platform is also configured to determine if a thematic trend is present in the metadata of the complaint records in the dataset. The machine learning platform may determine that a number of complaint records exceeds a trend threshold and provide a report indicating a thematic trend. For example, the metadata may indicate that a number of complaint records were received within a predetermined time period (e.g., 3 weeks, 3 months, etc.). The machine learning platform may determine that a seasonal trend is present within the dataset.

The machine learning platform uses a particular training dataset to train a semi-supervised machine learning text model to better identify a disposition of the complaint record. The training set is defined by a predetermined size and ratio of past complaint records. The ratio may include a natural ratio of sales practice complaints to not sales practice complaints and/or an oversampled ratio having more sales practice complaints than the natural ratio. Continuously training the model reduces the number of incorrect results (e.g., false positives and false negatives). In an example arrangement, the model uses a gradient boosting model design that was found to be the most effective when analyzing both the summary text fields and the resolution text fields.

In an example illustrative scenario, a computing device may receive a plurality of text records. In one example, the text records are complaint records, each complaint record having a summary field and a resolution field. The computing device may apply a classifier of a semi-supervised machine learning text model to generate a category score for each complaint record. The model may perform textual analytics on the summary fields and resolution fields and provide the category scores as output. The computing device may assign a disposition to each of the complaint records based on a comparison of the category score to a category threshold. The computing device may generate a second dataset including the plurality of complaint records from the first dataset and the disposition and category score for each complaint record. The computing device may also generate a report that includes the plurality of complaint records, the disposition, and the category score.

The computing device may also identify thematic trends of the first dataset. The thematic trend may include one or more of a seasonal trend, a source trend, a product trend, a location trend, and a provider trend. The seasonal trend may be based on the plurality of records having an amount of records within a predetermined date range that exceeds the trend threshold. The source trend may be based on the plurality of records having an amount of records from the same source that exceeds the trend threshold. The product trend may be based on the plurality of records having an amount of records associated with the same product that exceeds the trend threshold. The location trend may be based on the plurality of records having an amount of records form the same location that exceeds the trend threshold. The provider trend may be based on the plurality of records having an amount of records associated with the same provider employee that exceeds the trend threshold.

The model may be generated using a training dataset comprising past complaint records and categorization labels for each of the past complaint records. Each past categorization label includes a past disposition of the past complaint record associated with the past categorization label. The computing device may determine a training size and a training ratio to generate the training dataset. The computing device may apply the classifier of the semi-supervised machine learning text model to generate, for each past complaint record in the training dataset, a training category score, and provide the training category scores as output. The computing device may assign a training disposition to each past complaint record in the training dataset based on a comparison of the training category score to the category threshold. The computing device may determine an accuracy of the model based on the percentage of training dispositions that match the past disposition for each complaint record.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a component diagram of a machine learning platform 100 that may be configured to implement embodiments of the disclosed approach. As show, the machine learning platform 100 includes a computing device 110. In some embodiments the computing device 110 is associated with a service provider such as a business, a financial institution, and the like. A network 105 is communicably coupled to the computing device 110 such that the network 105 permits the direct or indirect exchange of data, values, instructions, messages, and the like (represented by the double-headed arrows in FIG. 1). In some embodiments, the network 105 is configured to communicably couple to additional computing devices. For example, the network 105 may facilitate communication of data between the computing device 110 and other computing device associated with the service provider. The network 105 may include one or more of a cellular network, the Internet, Wi-Fi, Wi-Max, a proprietary provider network, a proprietary retail or service provider network, and/or any other kind of wireless or wired network.

The computing device 110 includes a processing circuit 112, an input/output (I/O) circuit 120, one or more purpose built processing circuits shown as a text processing circuit 122 and an audit processing circuit 124, and a database 130. The processing circuit 112 may be coupled to the input/output device 120, the purpose built processing circuits, and/or the provider database 130. The processing circuit 112 may include a processor 114 and a memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicably coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the computing device 110 is configured to run a variety of application programs and store associated data in a database of the memory 116 (e.g., database 130).

The input/output circuit 120 is structured to receive communications from and provide communications to other computing devices, users, and the like associated with the computing device 110. The input/output circuit 120 is structured to exchange data, communications, instructions, etc. with an input/output component of the computing device 110. In one embodiment, the input/output device 120 includes communication circuitry for facilitating the exchange of data, values, messages, and the like between the input/output device 120 and the components of the computing device 110. In yet another embodiment, the input/output device 120 includes machine-readable media for facilitating the exchange of information between the input/output circuit 120 and the components of the computing device 110. In yet another embodiment, the input/output circuit 120 includes any combination of hardware components, communication circuitry, and machine-readable media.

In some embodiments, the I/O circuit 120 may include a network interface. The network interface may be used to establish connections with other computing devices by way of the network 105. The network interface may include program logic that facilitates connection of the computing device 110 to the network 105. For example, the network interface may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

In some embodiments, the I/O circuit 120 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 120 may provide an interface for the user to interact with various applications (e.g., a text processing application, an auditing application, a machine learning training application, etc.) stored on the computing device 110. For example, the input/output circuit 120 may include a keyboard, a keypad, a mouse, joystick, a touch screen, a microphone, a biometric device, a virtual reality headset, smart glasses, and the like. As another example, input/output circuit 120, may include, but is not limited to, a television monitor, a computer monitor, a printer, a facsimile, a speaker, and so on.

The memory 116 may store a database 130, according to some embodiments. The database 130 may be configured to store one or more applications. For example, the database 130 saves a text processing application, an auditing application, a machine learning training application, etc. In some embodiment and as shown in FIG. 1, the database 130 is configured to store record in a records vault 132 and training records in a training records vault 134. In some embodiments, the records vault includes text records, complaint records, and the like. The records may be associated with one or more business practices of the business associated with the computing device 110. The training records may include manually categorized and manually audited records provided to the computing device 110 to train a semi-supervised machine learning text model.

In some embodiments, the database 130 includes a records auditing application. In some embodiments, records auditing application may be incorporated with an existing application in use by the computing device 110. In some embodiments, records auditing application is a separate software application implemented on the computing device 110. The records auditing application may be downloaded by the computing device 110 prior to its usage, hard coded into the memory 116 of the provider processing system 112, or be a network-based or web-based interface application such that the computing device 110 may provide a web browser to access the application, which may be executed remotely from the computing device 110. Accordingly, the computing device 110 may include software and/or hardware capable of implementing a network-based or web-based application. For example, in some instances, records auditing application includes software such as HTML, XML, WML, SGML, PHP (Hypertext Preprocessor), CGI, and like languages.

In the latter instance, a user (e.g., a provider employee) may have to log onto or access the web-based interface before usage of the application. In this regard, the product records auditing application may be supported by a separate computing system including one or more servers, processors, network interface, and so on, that transmit applications for use to the computing device 110.

The text processing circuit 112 is configured to receive text records as input and provide a category score for each of the records as output. In an example embodiment, the text records include complaint records. Additionally, the text records include a summary field and a resolution field. The text processing circuit 112 is configured to utilize machine learning techniques to determine the category score. In an example embodiment, the text processing circuit 112 includes a semi-supervised machine learning text model. The text processing circuit 112 may be configured to apply a classifier of the semi-supervised machine learning text model to generate the category score for each of the records. The semi-supervised machine learning text model may be generated by using a training dataset that includes past text records and categorization labels and/or dispositions for each of the past text records. Further, the semi-supervised machine learning text model is configured to perform a textual analysis on the summary field and/or the resolution field and provide a category score as output. The semi-supervised machine learning text model may utilize one or more machine learning models or techniques to perform the textual analysis.

In some embodiments, the semi-supervised machine learning text model is configured to analyze one or more text fields of each of the text records provided to the text processing circuit. The semi-supervised machine learning text model may analyze the content of the text fields to identify the contexts of the text fields. In some embodiments, the semi-supervised machine learning text model uses natural language processing techniques to determine the contexts of the text fields. For example, the summary text filed may include a summary written by a provider employee. The summary may summarize a complaint that a user submitted. The semi-supervised machine learning text model may perform a textual analysis on the summary field to determine a category score for the record associated with the summary. In some embodiments, the category score may also be based on a textual analysis performed on a different text field such as a resolution text field that includes a summary of a resolution to the user's complaint.

In some embodiments, the semi-supervised machine learning text model includes a particular model design. For example, the model may include a Naïve Bayes model, a logistic regression model, a decision tree model, a random forest model, a gradient boosting model, a Naïve Bayes support vector machine model, a support vector clustering model, a bag of trick (neural network) model, and the like. In some embodiments, the machine learning text model utilizes two or more model designs to analyze the text fields. For example, the machine learning text model may utilize a bag of trick model and a Naïve Bayes support vector machine (NBSVM) model simultaneously to determine a category score for the text record. That is, the machine learning text model may utilize the two or more model designs to perform a textual analysis on the text fields and compare the category score of each of the design models. If two or more of the models agree on a category score, the machine learning text model may determine that the category score is correct and output the category score accordingly.

The audit processing circuit 124 is configured to receive a plurality of records from the computing device 110. In some embodiments, the records may be separated into one or more subsets by the processing circuit 112 before the audit processing circuit 124 receives the records. For example, a first subset may include records having a first disposition in a first disposition category and a second subset may include records having a second disposition in a second disposition category. The first disposition category may include dispositions that are desired to be audited, verified, or otherwise processed by the computing device 110. In these arrangements, the audit processing circuit 124 may receive the first subset of records from the computing device 110. The audit processing circuit 124 is configured to provide each text record of the first subset to the text processing circuit and receive a category label for each text record from the text processing circuit. The audit processing circuit 124 is also configured to assign a new or second disposition to each text record based on the categorical label. For example, the category score may be related to a determined context or reason for the complaint such as an account processing issue, a change in account status, an account dispute, a particular sales tactic, unauthorized access or change to an account, and the like. The audit processing circuit 124 may also be configured to determine whether the first disposition is different from the second disposition by comparing the first (i.e., original) disposition and the second disposition (i.e., new). The audit processing circuit 124 may also be configured to generate a report. The report may include each of the text records in the first subset and, for each text record, the disposition, the category score, and an indication of whether the first disposition is different from the second disposition. In some embodiments, the report may only include a record if the first disposition is different from the second disposition.

In some embodiments, the audit processing circuit 124 is configured to facilitate training of the machine learning text model. For example, the computing device 110 may receive and/or generate a training dataset that includes past records and manually verified dispositions. The audit processing circuit 124 may provide the training dataset to the text processing circuit 122 to perform textual analysis on the training dataset. The audit processing circuit 124 may receive a training category score for each of the past records of the training dataset and determine a training disposition for each of the past records. The audit processing circuit 124 may compare the training disposition to the manually verified disposition and determine an accuracy of the model based on the percentage of past records that have the same training disposition and manually verified disposition. The audit processing circuit 124 may generate a training report that includes an indication of the accuracy of the model.

In some embodiments, auditing process is performed by a records auditing application. For example, the records auditing application may be configured to receive, via the network 105 and/or the I/O circuit 120 a plurality of text records (e.g., complaint records, etc.) and provide the records to one or more of the processing circuits of the computing device 110 (e.g., the processing circuit 112, the text processing circuit 122, the audit processing circuit 124, etc.). The records auditing application may utilize the processing circuits to perform a textual analysis on text fields of each of the records and determine the disposition based on the textual analysis.

Figure 2:
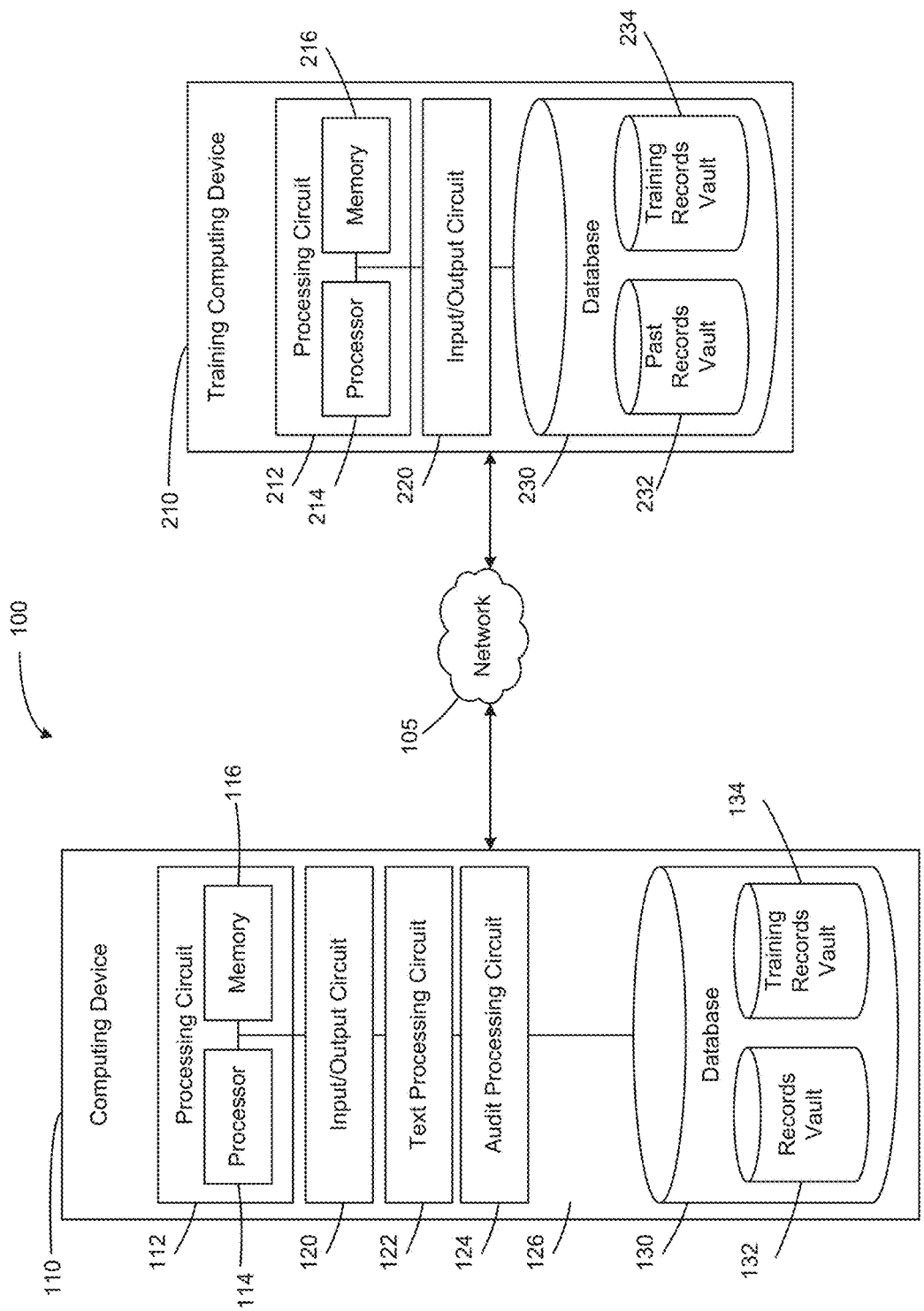
FIG. 2 is a component diagram of the machine learning platform of FIG. 1, according to various potential embodiments.

FIG. 2 is a component diagram of the machine learning platform 100 of FIG. 1, according to other example embodiments. As show, the machine learning platform 100 includes a network 105 and a computing device 110 as described above with respect to FIG. 1. In some embodiments, and as shown in FIG. 2, the machine learning platform 100 may also include a training computing device 210. The training computing device may be substantially similar in structure and/or function as the computing device 110. For example, the training computing device 210 similarly includes a processing circuit 212, an input/output (I/O) device 220, and a database 230.

The processing circuit 212 may be coupled to the input/output device 220 and/or the database 230. The processing system 212, the I/O device 220, and the database 230, and components thereof may function substantially similar to and include the same or similar components as the components of computing device 110, such as the processing circuit 112, the input/output device 120, and the database 130 described above. As such, it should be understood that the description of the processing system 112, the I/O device 120, and the database 130 of the computing device 110 provided above may be similarly applied to the processing circuit 212, the I/O device 220, and the database 230 of the training computing device 210. For example, the processing circuit 212 may include a processor 214 and memory 216 that are substantially similar to the processor 114 and the memory 116 described above with reference to the computing device 110. Similarly, the I/O device 220 may be substantially similar to the I/O device 120 described above with reference to the computing device 110. In some embodiments, the memory 216 includes a database 230. The user database 230 may be structured to store data related to a machine learning text model training application. The database 230 may also include a past records vault 232 configured to store all past records and a training records vault 234 configured to store records for training the machine learning text model.

In some embodiments, the database 230 may include a machine learning text model training application. In some embodiments, machine learning text model training application may be incorporated with an existing application in use by the training computing device 210. In some embodiments, machine learning text model training application is a separate software application implemented on the training computing device 110. The machine learning text model training application may be downloaded by the training computing device 210 prior to its usage, hard coded into the memory 216 of the training computing device 210, or be a network-based or web-based interface application such that the training computing device 210 may provide a web browser to access the application, which may be executed remotely from the training computing device 210. Accordingly, the training computing device 210 may include software and/or hardware capable of implementing a network-based or web-based application. For example, in some instances, records auditing application includes software such as HTML, XML, WML, SGML, PHP (Hypertext Preprocessor), CGI, and like languages.

According to an example embodiment, the training computing device 210 is configured to generate a training dataset and provide the training dataset to the computing device 110. In some embodiments, the training dataset is configured to train the machine learning text model of the computing device 110 to better determine a characterization score for each record input into the model. The training dataset includes a plurality of past records and a disposition for each of the past records. The training dataset may also include a characterization score for each of the past records. The characterization score may have been previously generated by a text model (e.g., a text model of the computing device 110). The training dataset may include various parameters determined by a user and/or by automatic machine learning technique. The parameters may include a training dataset size (e.g., the amount of records in the training dataset) and a training dataset ration (e.g., a ratio of records having a disposition in a first category to records having a disposition in a second category). In some embodiments, the machine learning text model training application is structured to generate the training dataset for the computing device 110.

Figure 3:
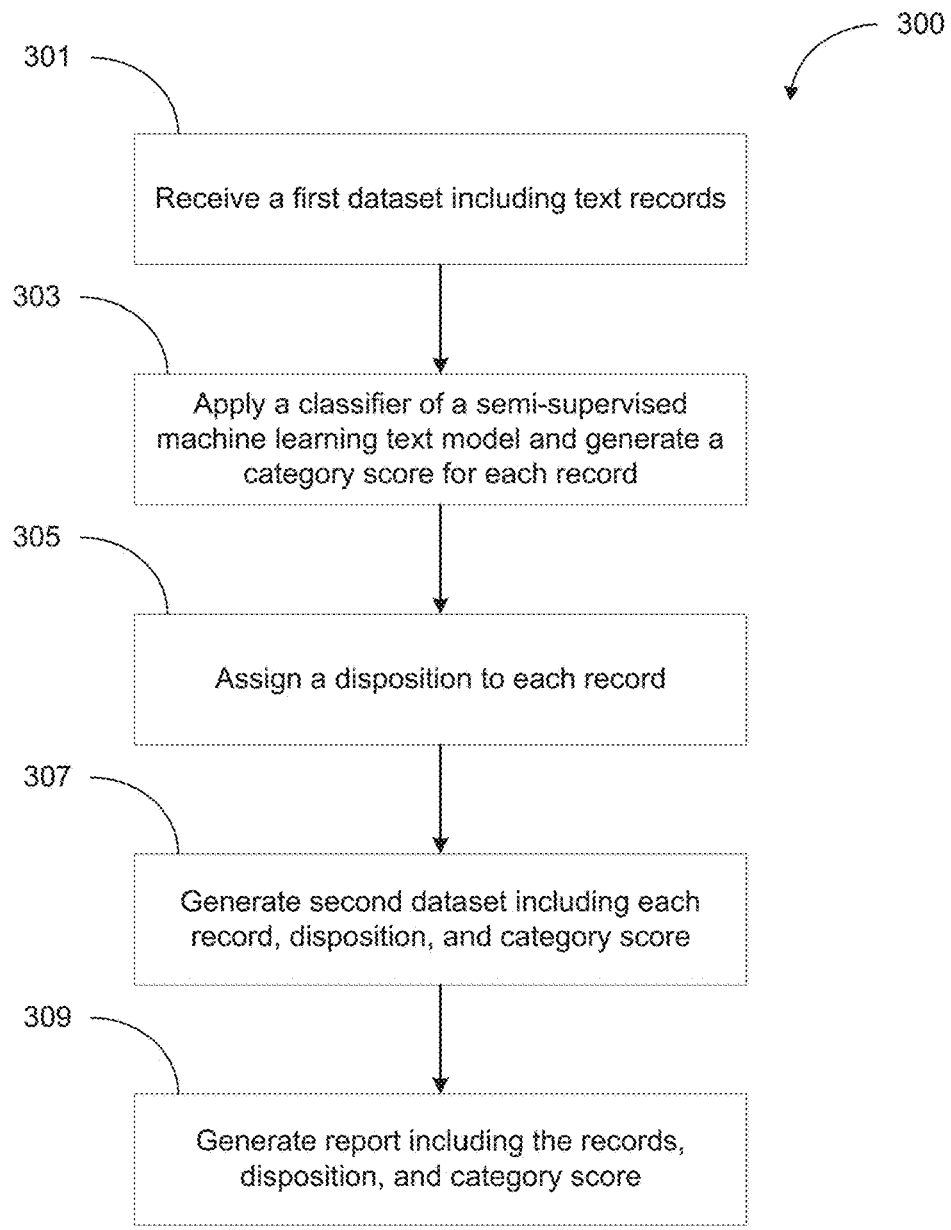
FIG. 3 is a flow diagram of a method for auditing records, according to various potential embodiments.

FIG. 3 is a flow diagram of a method 300 for auditing records, according to an example embodiment. The machine learning platforms 100 can be configured to perform method 300. For example, the computing device 110 may, alone or in combination with other devices, perform the method 300. Further, the method 300 may include user inputs from one or more user devices (such as devices of provider employees), another computing device on the network 105, and the like.

In broad overview of method 300, at block 301, the computing device 110 receives a first dataset including text records. At block 303, the computing device 110 applies a classifier of a semi-supervised machine learning text model and generates a category score for each record. At block 305, the computing device 110 assigns a disposition to each record. At block 307, the computing device 110 generates a second dataset including each record, disposition, and category score. At block 309, the computing device 110 generates a report that includes each record, disposition, and category score.

Referring to method 300 in more detail, at block 301, the computing device 110 receives a first dataset including text records. The text records may include one or more text fields such as a summary field and a resolution field. In some embodiments, each of the text records also includes a first disposition or an original disposition. The first disposition may be assigned to the record manually and/or when the record was created. In some embodiments, at block 301, the computing device 110 also separates the first dataset into one or more subsets of records. The subsets may be based on the first disposition.

At block 303, the computing device 110 applies a classifier of a semi-supervised machine learning text model and generates a category score for each record. For example, the computing device 110 may have an audit processing circuit 124 and a text processing circuit 122 as described above with respect to FIG. 1. The computing device 110 may utilize one or more processing circuits to apply the classifier of the machine learning text model and generate the category score for each text record.

At block 305, the computing device 110 assigns a disposition (e.g., a second disposition) to each record. In some embodiments, the disposition is based on the category score generated at block 303 such that each unique category score is associated with a disposition. In some embodiments, the disposition is assigned on a best-fit basis. In some embodiments, the computing device compares assigns the disposition based on a comparison of the category score to a category threshold. For example, the category threshold may include one or more category scores. Scores above the threshold may be identified as having a sales practice disposition. Scores below the threshold may be identified as having a non-sales practice disposition.

At block 309, the computing device 110 generates a second dataset including each record, disposition, and category score. In some embodiments, the computing device 110 also determines whether the first disposition and the second disposition are the same or different. In these arrangements, the computing device 110 may be configured to only include a record in the second dataset if the first disposition and the second disposition are different. Further, the computing device 110 may be configured to generate a third dataset that includes a record if the first disposition and the second disposition are the same.

Figure 4:
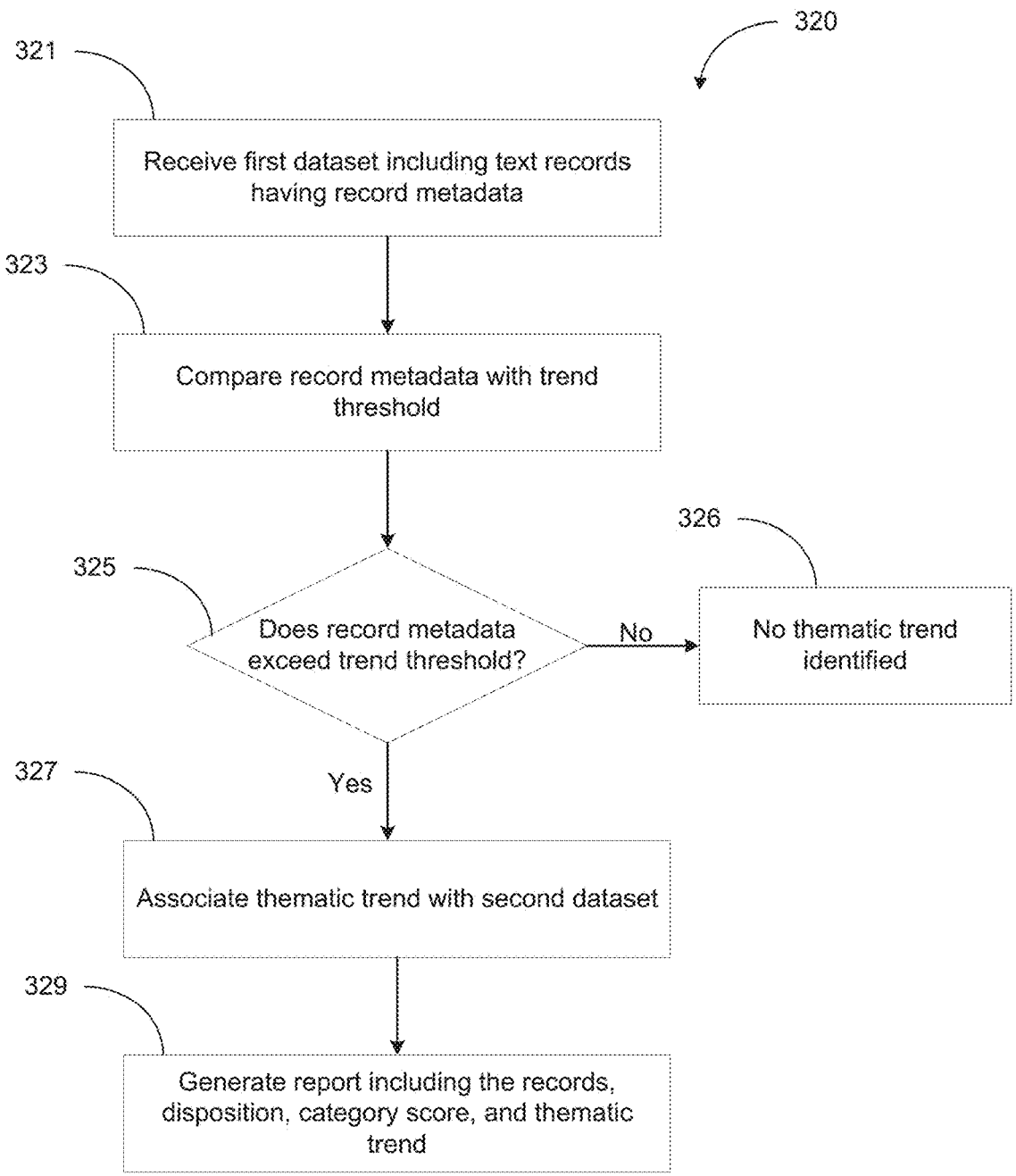
FIG. 4 is a flow diagram of a method for identifying thematic trends in records, according to various potential embodiments.

FIG. 4 is a flow diagram of a method 320 for identifying thematic trends in records, according to an example embodiment. The machine learning platforms 100 can be configured to perform method 320. For example, the computing device 110 alone or in combination with other devices may perform the method 320. Further, the method 320 may include user inputs from one or more users such as a provider employee, another computing device on the network 105, and the like. In some embodiments, the method 320 may be performed before, concurrently, partially concurrently, or after the method 300. For example, block 321 may be part of and or performed concurrently with block 301. Similarly, blocks 307 and 309 may be performed concurrently with block 327 and 329, respectively.

In broad overview of method 320, at block 321, the computing device 110 receives a first dataset including text records having metadata. At block 323, the computing device 110 compares the record metadata with a trend threshold. At block 325, the computing device 110 determines if the record metadata exceeds the trend threshold. At block 326, the computing device 110 determines that no thematic trend can be identified based on the record metadata not exceeded the trend threshold. At block 327, the computing device 110 associates a thematic trend with the second dataset. At block 329, the computing device 110 generates a report that includes each record, disposition, category score, and thematic trend.

Referring to method 320 in more detail, at block 301 the computing device 110 receives a first dataset including text records. The text records may include one or more text fields such as a summary field and a resolution field. In some embodiments, each of the text records also includes a first disposition or an original disposition. The first disposition may be assigned to the record manually and/or when the record was created. In some embodiments, at block 301, the computing device 110 also separates the first dataset into one or more subsets of records. The subsets may be based on the first disposition. The text records also include metadata such as a date the record was received, a source of the record (e.g., in person, via email, via telephone, via a webpage, etc.), a product related to the record (e.g., a product or service provided by the service provider associated with the computing device 110), a location associated with the origin of the record (e.g., a location of the user and/or a physical location of the service provider), an identification of a provider employee associated with the record (e.g., an employee who received the record, a record regarding the work performance of an employee, etc.), and the like. In some embodiments, at block 301, the computing device 110 also separates the first dataset into one or more subsets of records. The subsets may be based on the first disposition and/or the metadata.

At block 323, the computing device 110 compares the record metadata with a trend threshold. The trend threshold may be based on the type of metadata being compared. For example, a seasonal trend threshold may include a particular date range, a source trend threshold may include a number of occurrences (records) originating from the same source, a product trend threshold may include a number of occurrences associated with a particular product or service provided with the business associated with the computing device 110, a location trend threshold may include a number of occurrences originating from the same location, a provider trend threshold may include a number of occurrences associated with a particular employee of the provider.

At block 325, the computing device 110 compares the record metadata with a trend threshold and determines if the record metadata exceeds the trend threshold. In some embodiments, the computing device 110 is configured to compare record metadata from records in the first dataset, the second dataset, and/or one or more of the subsets of the first dataset. If the computing device 110 determines that the number of record metadata does not exceed the trend threshold, the computing device 110 goes to block 236. If the computing device 110 determines that the number of record metadata exceeds the trend threshold, the computing device 110 goes to block 237.

At block 326, the computing device determines 110 that no thematic trend is identified in the plurality of records (e.g., the first dataset, the first subset, etc.) received by the computing device 110. In some embodiments, the computing device 110 goes to block 329 and includes an indication that no thematic trend was identified in the report.

At block 327, the computing device 110 associates a thematic trend with the second dataset (e.g., the second dataset generated at block 307). The thematic trend may include one or more of a seasonal trend, a source trend, a product trend, a location trend, and a provider trend. The seasonal trend may be based on the plurality of records (e.g., the first dataset, the second dataset, the first subset, etc.) having an amount of records within a predetermined date range that exceeds the trend threshold. The source trend may be based on the plurality of records having an amount of records from the same source that exceeds the trend threshold. The product trend may be based on the plurality of records having an amount of records associated with the same product that exceeds the trend threshold. The location trend may be based on the plurality of records having an amount of records form the same location that exceeds the trend threshold. The provider trend may be based on the plurality of records having an amount of records associated with the same provider employee that exceeds the trend threshold.

At block 329, the computing device 110 generates a report including the records, the disposition, the category score, and the thematic trend. In some embodiments, when the computing device 110 determines that a thematic trend cannot be identified, the report includes an indication that a thematic trend was not identified.

Figure 5A:
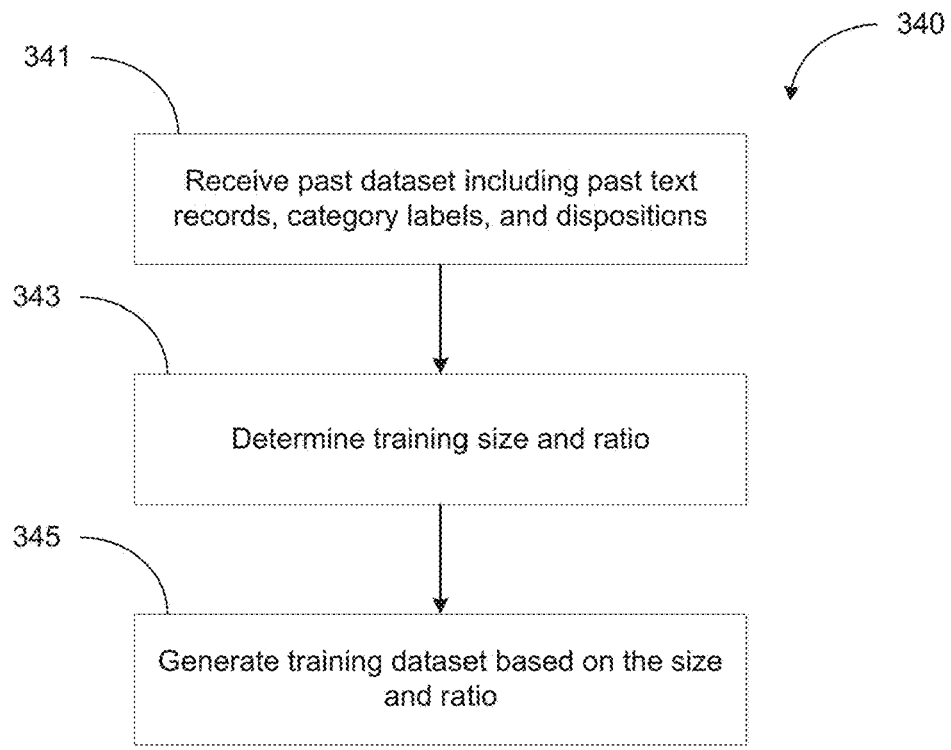
FIG. 5A is a flow diagram of a method for generating a training dataset of records, according to various potential embodiments.

FIG. 5A is a flow diagram of a method 340 for generating a training dataset of records, according to an example embodiment. The machine learning platforms 100 can be configured to perform method 340. For example, the training computing device 210 may perform the method 340. In another example, the computing device 110 may incorporate the features of the computing device 210 and perform the method 340. Further, the method 340 may include user inputs from one or more user devices (such as devices of provider employees), another computing device on the network 105, and the like.

In broad overview of method 340, at block 341, the training computing device 210 receives a past dataset including past text records, past category labels, and past dispositions. At block 343, the training computing device 210 determines a training size and ratio. At block 345, the training computing device 210 generates a training dataset based on the size and ratio.

Referring to method 340 in more detail, at block 341, the training computing device 210 receives a past dataset including past text records, past category labels, and past dispositions. In some embodiments, the past dispositions are verified to be correct (e.g., by a user). In some embodiments, the past text records do not include a past category label. That is, the past text records may not have been analyzed by a text model. In some embodiments, the past text records may also include metadata as described above with respect to FIG. 4.

At block 343, the training computing device 210 determines a training size and ratio. The training size includes an amount of past records to include in the training dataset. The size may be 5000 records, 10,000 records, 20,000 records, 50,000 records, etc. The ratio is a ratio between records having a past disposition in a first category and records having a past disposition in a second category. The first category may include a first set of dispositions and the second category may include a second set of dispositions. For example, the first category may include sales practice related dispositions and the second category may include any other disposition. The ratio may include a natural ratio (e.g., around 4%) or an oversample ratio (e.g., more than 4%) such as 50%, 75%, or 90%.

At block 345, the training computing device 210 generates the training dataset based on the size and ratio. The training dataset may include a plurality of past text records, the summary text field, and/or the resolution text field. The training dataset may also include the past dispositions, past category labels, and/or past metadata.

Figure 5B:
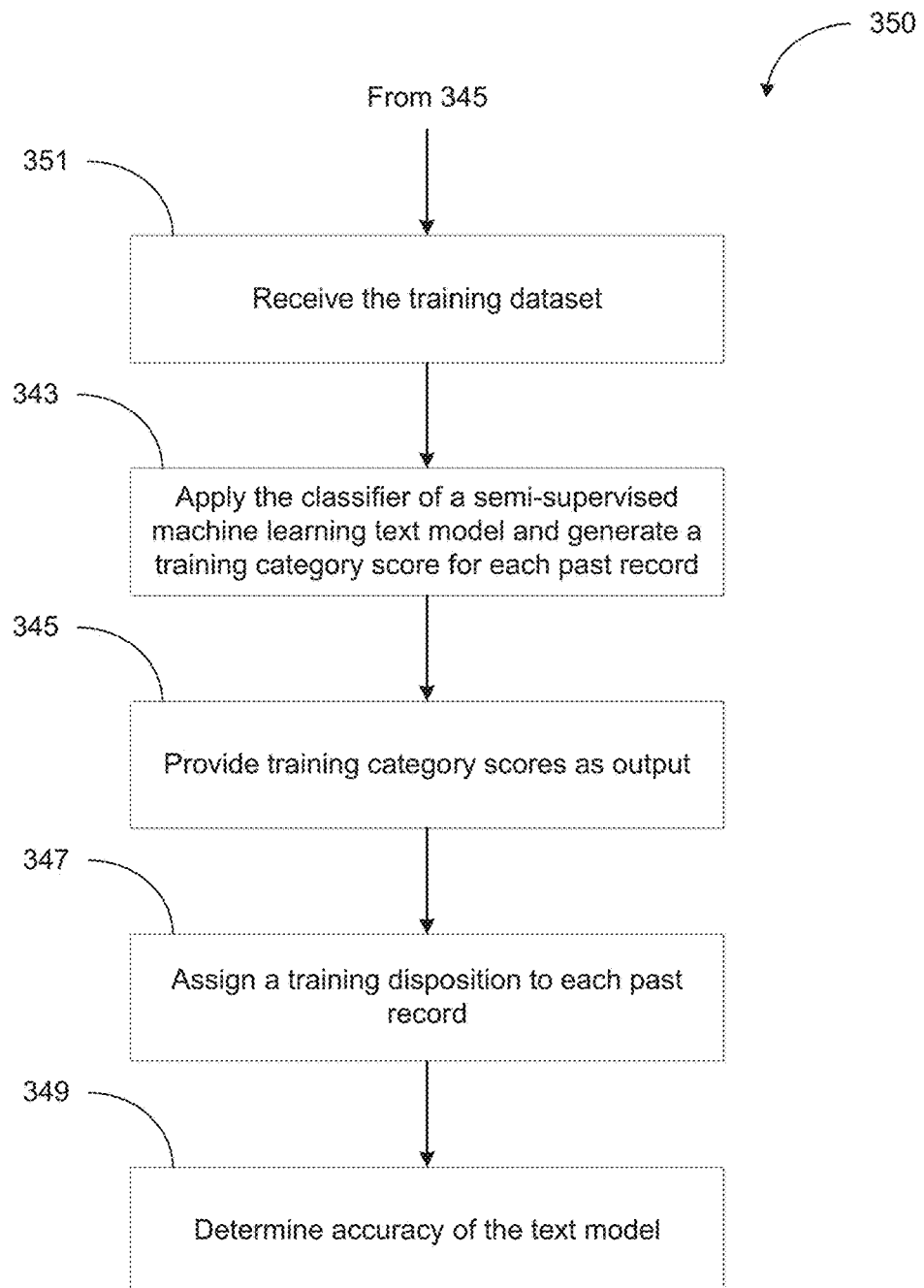
FIG. 5B is a flow diagram of a method for training a semi-supervised machine learning model using the training dataset of FIG. 5A, according to various potential embodiments.

FIG. 5B is a flow diagram of a method 350 for training a semi-supervised machine learning model using the training dataset of FIG. 5A. The machine learning platforms 100 can be configured to perform method 350. For example, the computing device 120, alone or in combination with other devices, may perform the method 350. Further, the method 350 may include user inputs from one or more users such as a provider employee, another computing device on the network 105, and the like. In some embodiments, the method 450 continues from the method 340 shown by the arrow coming from bock 345.

In broad overview of method 350, at block 351, the computing device 110 receives the training dataset. At block 353, the computing device applies the classifier of a semi-supervised machine learning text model and generates a training category score for each past record. At block 355, the computing device 110 provides training category scores as output. At block 357, the computing device 110 assigns a training disposition to each past record. At block 359, the computing device 110 determines the accuracy of the text model.

Referring to method 350 in more detail, at block 351 the computing device 110 receives the training dataset. In some embodiments, the training dataset is received from the training computing device 210. In some embodiments, the training dataset is generated by the computing device 110. In these embodiments, block 351 may be skipped.

At block 353, the computing device 110 applies the classifier of the semi-supervised machine learning text model and generates a training category score for each past record in the training dataset. In some embodiments, the computing device 110 is configured to provide the past records to the text model without the past disposition and/or without the past category label.

At block 355, the computing device 110 provides the training category scores as output. In some embodiments, the output is provided by a component of the computing device 110 (e.g., the text processing circuit 122) to another component of the component device 110 (e.g. the audit processing circuit 124.

At block 357, the computing device 110 assigns a training disposition to each of the past records. The training disposition may be based on the training category score.

At block 359, the computing device 110 determines the accuracy of the text model. The computing device 110 may compare the training disposition to the past disposition. The computing device 110 may determine that the training disposition is correct if the training disposition is the same as the past disposition. The accuracy may be output as a percentage of correct training dispositions out of all the training dispositions. In some embodiments, the computing device 110 is also configured to generate a training report at block 359 that includes each past record, past disposition, training disposition, and an indication of the accuracy of the text model.

Figure 6:
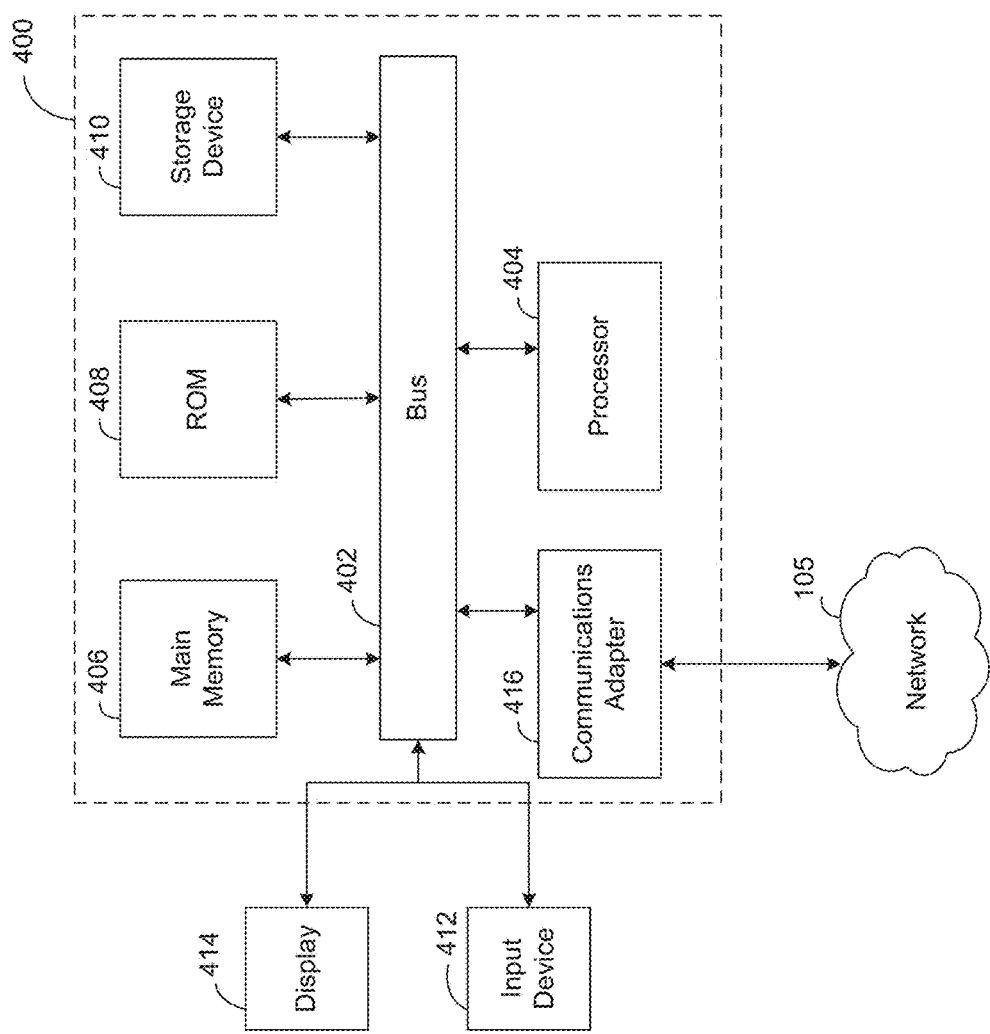
FIG. 6 is a component diagram of an example computing system suitable for use in the various embodiments described herein.

FIG. 6 is a component diagram of an example computing system 400 suitable for use in the various embodiments described herein. For example, the computing system 400 may implement an example computing device 110, an example training computing device 210, and/or various other example systems and devices described in the present disclosure. The computing system 400 includes a bus 402 or other communication component for communicating information and a processor 404 coupled to the bus 402 for processing information. The computing system 400 also includes main memory 406, such as a random access memory (RAM) or other dynamic storage device, coupled to the bus 402 for storing information, and instructions to be executed by the processor 404. Main memory 406 can also be used for storing position information, temporary variables, or other intermediate information during execution of instructions by the processor 404. The computing system 400 may further include a read only memory (ROM) 408 or other static storage device coupled to the bus 402 for storing static information and instructions for the processor 404. A storage device 410, such as a solid state device, magnetic disk or optical disk, is coupled to the bus 402 for persistently storing information and instructions.

The computing system 400 may be coupled via the bus 402 to a display 414, such as a liquid crystal display, or active matrix display, for displaying information to a user. An input device 412, such as a keyboard including alphanumeric and other keys, may be coupled to the bus 402 for communicating information, and command selections to the processor 404. In another arrangement, the input device 412 has a touch screen display. The input device 412 can include any type of biometric sensor, a cursor control, such as a mouse, a trackball, or cursor direction keys, for communicating direction information and command selections to the processor 404 and for controlling cursor movement on the display 414.

In some arrangements, the computing system 400 may include a communications adapter 416, such as a networking adapter. Communications adapter 416 may be coupled to bus 402 and may be configured to enable communications with a computing or communications network 105 and/or other computing systems. In various illustrative arrangements, any type of networking configuration may be achieved using communications adapter 416, such as wired (e.g., via Ethernet), wireless (e.g., via Wi-Fi, Bluetooth, etc.), satellite (e.g., via GPS) pre-configured, ad-hoc, LAN, WAN, etc.

According to various arrangements, the processes that effectuate illustrative arrangements that are described herein can be achieved by the computing system 400 in response to the processor 404 executing an arrangement of instructions contained in main memory 406. Such instructions can be read into main memory 406 from another computer-readable medium, such as the storage device 410. Execution of the arrangement of instructions contained in main memory 406 causes the computing system 400 to perform the illustrative processes described herein. One or more processors in a multi-processing arrangement may also be employed to execute the instructions contained in main memory 406. In alternative arrangements, hard-wired circuitry may be used in place of or in combination with software instructions to implement illustrative arrangements. Thus, arrangements are not limited to any specific combination of hardware circuitry and software.

Figure 7:
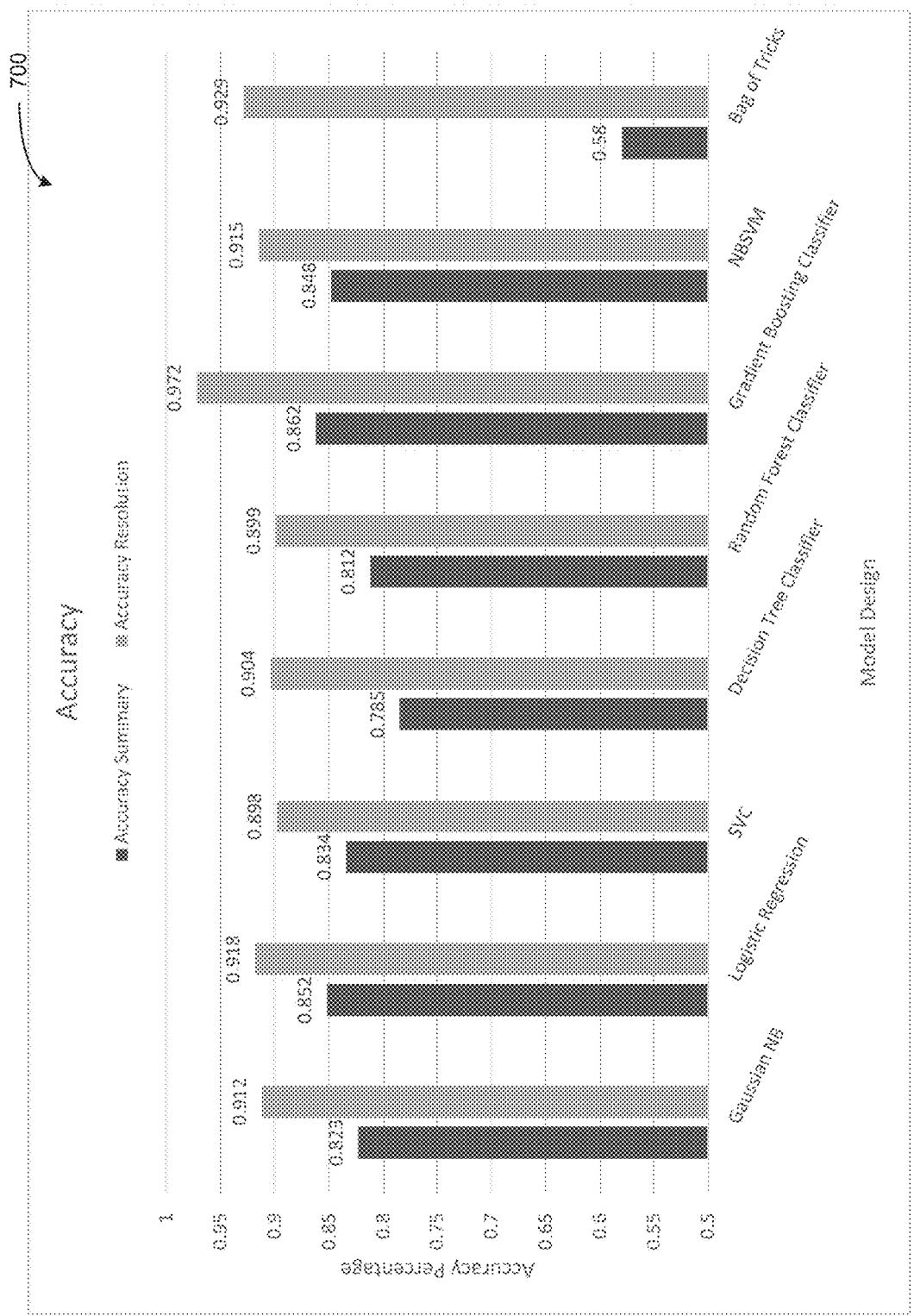
FIG. 7 is a bar graph showing an accuracy percentage for each model design, according to an example embodiment.

FIG. 7 is a bar graph 700 showing an accuracy percentage for each model design, according to various example embodiments. As shown by the legend, the dark bars represent an accuracy percentage when each of the models analyze a summary text field, and the light bars represent an accuracy percentage when the models analyze a resolution text field.

In an example embodiment, the machine learning text model utilizes a gradient boosting model. As shown in FIG. 7, the gradient boosting classifier had a high accuracy percentage when analyzing both a summary text field and a resolution text field of a complaint record. The bag of tricks model also had a high accuracy percentage when analyzing a resolution text field, but fell behind significantly when analyzing a summary text field. Accordingly, the machine learning text model may utilize a different model design to analyze different texts fields of the records.

In an additional example embodiment, the machine learning text model may utilize the gradient boosting model design to simplify the design of the machine learning text model. Further, the gradient boosting model may utilize fewer resources compared to other model designs. For example, a bag of tricks model design may require additional hardware and software implementations to accommodate the neural network necessary to facilitate the bag of tricks model design. While the gradient boosting model is less accurate when analyzing resolution text fields, the gradient boosting model has a relatively high accuracy compared to other model designs and maintains a relatively high accuracy for analyzing summary text fields. Accordingly, the gradient boosting model may be utilized if a simple design and/or resource limited design is required.

In various embodiments, the system may analyze records and, based on the characteristics of fields in the records (such as data types, lengths, etc.), select a model (or combination of models) deemed most suitable for the records (or subsets of records) based on the strengths or weaknesses of the models as represented in FIG. 7. If the records change over time (e.g., as to what or how records are annotated or described, addition of fields, changes to what length or type of text that is permitted, etc.), the predictive models being implemented may be updated or changed (e.g., parameters retuned or retrained using a new training dataset) to accommodate changes in the records.

Figure 8:
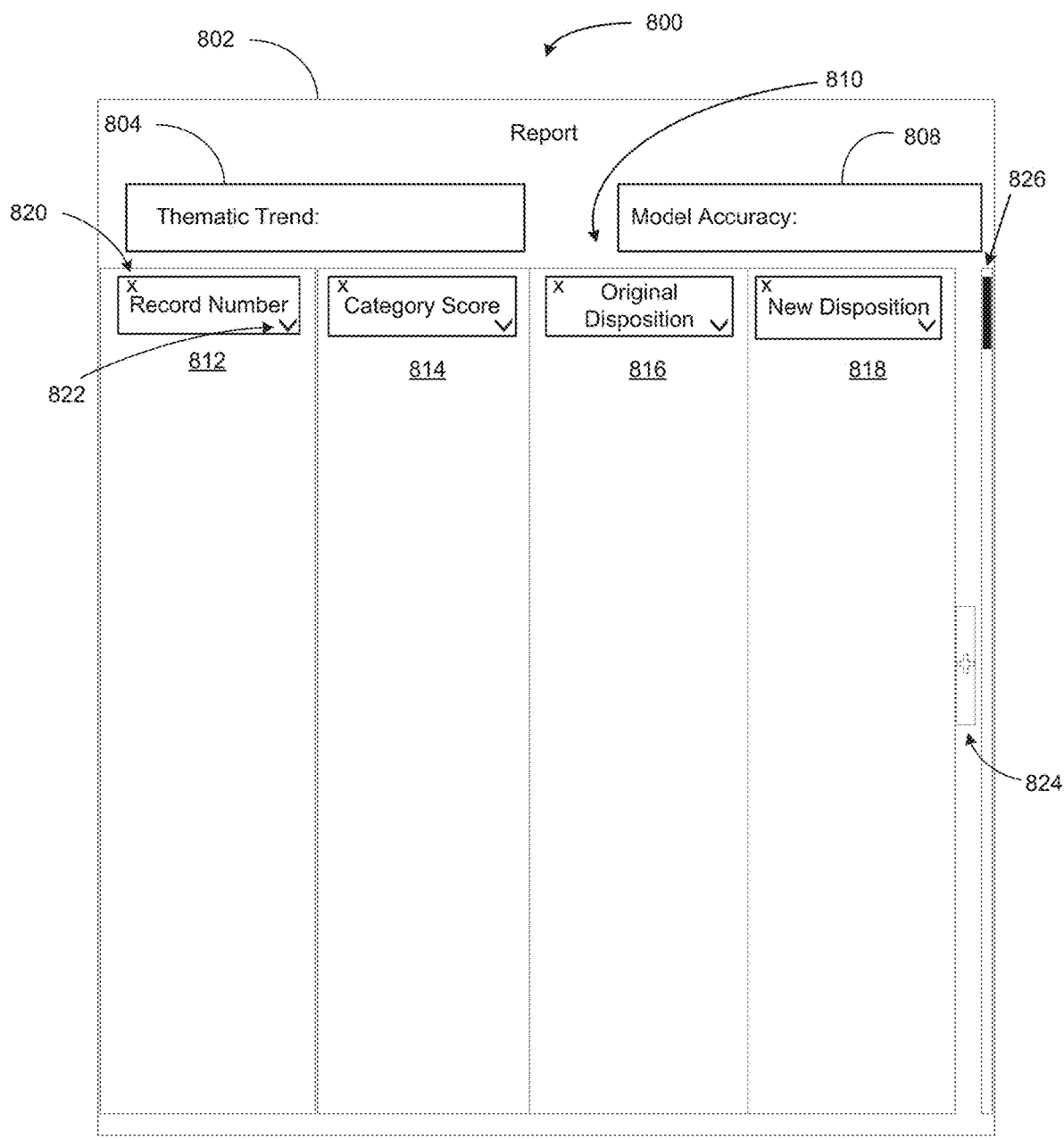
FIG. 8 is an example graphical user interface for the machine learning platform, according to various potential embodiments.

FIG. 8 is an illustration of a graphical user interface output 800 of the machine learning platform 100 of FIG. 1, according to example embodiments. The graphical user interface (GUI) output 800 includes a report box 802. The report box 802 contains the information output by the computing device 110. As shown, the report box 802 may include a thematic trend box 804, a model accuracy box 808, and a plurality of data columns 810 shown as a record number column 812, a category score column 814, an original disposition column 816, and a new disposition column 818.

The thematic trend box 804 is configured to indicate a thematic trend of the second dataset. In some embodiments, the report box 802 may include multiple thematic trend boxes 804 based on the computing device 110 determining that the second dataset has more than one thematic trend. The model accuracy box 808 is configured to indicate the accuracy of the model determined by the computing device 110 and/or the training computing device 210.

The plurality of columns 810 are configured to display a sequence of data such that each row of the columns 810 is related to a single text record. The record number column 812 is configured to display a sequence of records (e.g., records in the second dataset). For example, the sequence of records may include a name or title of the record such as "101B", "521A", "7266", etc. The category score column 814 is configured to display the category score determined by the machine learning text model. The original disposition column 816 is configured to display the original disposition (e.g., the first disposition) of each of the records. The new disposition column 818 is configured to display the new disposition (e.g., the second disposition) of each of the records assigned by the computing device 110 and/or by the audit processing circuit 124.

In some embodiments, the GUI 800 is configured to be customizable by a user. As shown, the GUI 800 includes various customizable elements including a delete column button 820 and a sort by button 822 positioned on each of the data columns 810. The GUI 800 also includes an add column button 824 and a scroll bar 826 shown positioned on a right side of the GUI 800. The delete column button 820 is configured to remove the data column on which the button is positioned. For example, the "x" delete column button positioned on the original disposition column 816 is configured to delete the original disposition column from the report. The sort by buttons 822 are configured to sort the data in each of the columns by the data within the column of the button 822. When the data is sorted in this way, each row is maintained such that each row still represents data from a single record. For example, the "v" sort button positioned on the new disposition button will sort all data by the new disposition (e.g., alphabetically, reverse alphabetically, numerically, etc.). The add column button 824 is configured to add additional data columns to the report box 802. In some embodiments, when the add column button 824 is selected by a user, the add column button 824 may expand into a dropdown menu including all possible data columns that can be added to the report box 802. For example, the dropdown menu may include an option to add additional data columns such as a metadata column. The scroll bar 826 is configured to be selectable and/or movable by a user input to scroll through the data in the data columns 810.

In some embodiments, the report box 802 is configured as a standard report for the second dataset. In these embodiments, the report box 802 may not include a model accuracy box 808. In some embodiments, the first dataset does not include metadata. In these embodiments, the report box 802 may be configured to not include the thematic trend box 804 and/or the model accuracy box 808. In some embodiments, the report box 802 is configured as a training report. In these embodiments, the report box 802 is configured to not include the thematic trend box 804.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method comprising:
   receiving, by a first computing device of a machine learning platform, from a second computing device, a past dataset comprising the past complaint records and categorization labels for each of the past complaint records, where each past categorization label includes a past disposition of the past complaint record associated with the past categorization label;
   determining, by the first computing device, a training size between 5,000 and 50,000 training complaint records;
   determining, by the first computing device, a training ratio including a ratio of a first set of past complaint records to a second set of past complaint records;
   generating, by the first computing device, the training dataset based on the training size and the training ratio;
   training, by the first computing device, using the training dataset, a semi-supervised machine learning text model to perform textual analytics on complaint summary and resolution fields received as inputs and provide category scores as output;
   receiving, by the first computing device, a first dataset comprising a plurality of complaint records, each complaint record comprising a complaint summary field and a resolution field;
      applying, by the first computing device to the first dataset, a classifier of the semi-supervised machine learning text model to generate, for each complaint record in the first dataset, a category score;

assigning, by the first computing device, a disposition to each complaint record in the first dataset based on a comparison of the category score to a category threshold;

generating, by the first computing device, a second dataset comprising the plurality of complaint records from the first dataset and, for each complaint record, the assigned disposition;

generating, by the first computing device, a report comprising the plurality of complaint records and, for each complaint record, the disposition and the category score;

detecting, by the first computing device, a change in the past dataset; and responsive to detecting the change in the past dataset, retuning, by the first computing device, the semi-supervised machine learning text model based at least on the change in the past dataset.

2. The method of claim 1, wherein the method further comprises identifying, by the first computing device, a thematic trend associated with the first dataset, the thematic trend identified based on a first subset of complaint records of the first dataset exceeding a trend threshold.

3. The method of claim 2, wherein the method further comprises selectively assigning at least one of the complaint records to the first subset based on the content of the complaint record; and wherein each complaint record further comprises:
a date the complaint record was received;
a source of the complaint record;
a product related to the complaint record;
a location associated with the origin of the complaint record; and
an identification of a provider employee associated with the complaint.

4. The method of claim 3, wherein the thematic trend includes one or more of:
a seasonal trend, where the date of each of the complaint records in the first subset is within a predetermined range of each other and the first subset exceeds the trend threshold;
a source trend, where the source of each of the complaint records in the first subset is the same and the first subset exceeds the trend threshold;
a product trend, where the product of each of the complaint records in the first subset is the same and the first subset exceeds the trend threshold;
a location trend, where the location of each of the complaint records in the first subset is the same and the first subset exceeds the trend threshold; and
a provider trend, where the identification of each of the complaint records in the first subset is the same and the first subset exceeds the trend threshold.

5. The method of claim 1, wherein a first categorization label in the first set is associated with one of a predetermined disposition set and where a second categorization label in the second set is not associated with one of the predetermined disposition set.

6. The method of claim 1, wherein the method further comprises:
receiving, by the first computing device, the training dataset;
applying, by the first computing device to the training dataset, the classifier of the semi-supervised machine learning text model to generate, for each past complaint record in the training dataset, a training category score, and provide the training category scores as output; and assigning, by the first computing device, a training disposition to each past complaint record in the training dataset based on a comparison of the training category score to the category threshold.

7. The method of claim 6, wherein the method further comprises determining, by the first computing device, an accuracy of the model by comparing the training dispositions to the past disposition for each of the past complaint records in the training dataset.

8. The method of claim 1, wherein the model utilizes at least one of a plurality of machine learning techniques comprising:
a Naïve Bayes model;
a logistic regression model;
a decision tree model;
a random forest model;
a gradient boosting model;
a Naïve Bayes support vector machine model; and
a bag of tricks model; and
wherein the model is configured to simultaneously utilize at least two of the plurality of machine learning techniques to perform textual analytics on the complaint summary and the resolution fields and provide the category scores as output.

9. The method of claim 1, wherein the model has a gradient boosting model design.

10. A machine learning platform comprising:
a computing device configured to:
receive a past dataset comprising the past complaint records and categorization labels for each of the past complaint records, where each past categorization label includes a past disposition of the past complaint record associated with the past categorization label;
determine a training size between 5,000 and 50,000 training complaint records;
determine a training ratio including a ratio of a first set of past complaint records to a second set of past complaint records;
generate the training dataset based on the training size and the training ratio;
train, using the training dataset, a semi-supervised machine learning text model to perform textual analytics on complaint summary and resolution fields received as inputs and provide category scores as output;
receive a first dataset comprising a plurality of text records, each text record comprising a summary field, a resolution field, and a first disposition, the computing device configured to assign each of the plurality of text records to at least one of a first subset and a second subset based on the first disposition and provide the first subset as output;
a text processing circuit configured to analyze text fields using the semi-supervised machine learning text model that receives textual inputs and provides a category score as output; and
an audit processing circuit configured to:
receive the first subset from the computing device;
provide each text record of the first subset to the text processing circuit;
receive a categorical label for each text record from the text processing circuit;
assign a second disposition to each text record based on the categorical label;
determine whether the first disposition is different from the second disposition by comparing the first disposition and the second disposition;
generate a report comprising the first subset and, for each text record, the disposition, the category score, and an indication of whether the first disposition is different from the second disposition;
detect a change in the past dataset; and
responsive to detecting the change in the past dataset, retune the semi-supervised machine learning text model based at least on the change in the past dataset.

11. The system of claim 10, wherein each of the plurality of text records further comprises:
   a date the text record was received;
   a source of the text record;
   a product related to the text record;
   a location associated with the origin of the text record; and
   an identification of a provider employee associated with the text record.

12. The system of claim 11, wherein the audit processing circuit is further configured to determine a thematic trend of the first subset based on an amount of text records of the first subset exceeding a trend threshold; and
   wherein the thematic trend includes one or more of:
      a seasonal trend determined based on the first subset having an amount of records within a predetermined date range that exceeds the trend threshold;
      a source trend determined based on the first subset having an amount of records from the same source that exceeds the trend threshold;
      a product trend determined based on the first subset having an amount of records associated with the same product that exceeds the trend threshold;
      a location trend determined based on the first subset having an amount of records form the same location that exceeds the trend threshold;
      a provider trend determined based on the first subset having an amount of records associated with the same provider employee that exceeds the trend threshold.

13. The system of claim 10, wherein the audit processing circuit is further configured to:
   provide the training dataset to the text processing circuit without the past disposition for each of the past text records;
   receive a training categorical label for each past text record from the text processing circuit;
   assign a training disposition to each past text record based on the training categorical label;
   determine whether the past disposition is different from the training disposition;
   generate a training report comprising the training dataset, the past disposition, the training disposition, and an indication of whether the past disposition is different from the training disposition.

14. The system of claim 13, wherein the computing device is further configured to:
   receive the training report from the audit processing circuit; and
   modify the model based on the past disposition being different from the training disposition such that the model more accurately determines a correct categorical label.

15. The system of claim 10, wherein the text processing circuit is configured to utilize one or more of a Naïve Bayes model, a logistic regression model, a decision tree model, a random forest model, a gradient bosting model, a Naïve Bayes support vector machine model, and a bag of tricks model simultaneously to determine the categorical label.

16. A non-transitory computer-readable storage medium having instructions stored thereon that, when executed by at least one processing circuit, cause the at least one processing circuit to:
   receive a past dataset comprising the past complaint records and categorization labels for each of the past complaint records, where each past categorization label includes a past disposition of the past complaint record associated with the past categorization label;
   determine a training size between 5,000 and 50,000 training complaint records;
   determine a training ratio including a ratio of a first set of past complaint records to a second set of past complaint records;
   generate the training dataset based on the training size and the training ratio;
   train, using the training dataset, a semi-supervised machine learning text model to perform textual analytics on complaint summary and resolution fields received as inputs and provide category scores as output;
   receive a first dataset comprising a plurality of complaint records, each complaint record comprising a complaint summary field and a resolution field;
   apply a classifier of the semi-supervised machine learning text model to generate, for each complaint record in the first dataset, a category score;
   assign a disposition to each complaint record in the first dataset based on a comparison of the category score to a category threshold;
   generate a second dataset comprising the plurality of complaint records from the first dataset and, for each complaint record, the assigned disposition;
   generate a report comprising the plurality of complaint records and, for each complaint record, the disposition and the category score;
   detect a change in the past dataset; and
   responsive to detecting the change in the past dataset, retune the semi-supervised machine learning text model based at least on the change in the past dataset.

17. The non-transitory computer-readable medium of claim 16, wherein the medium further stores instructions that, when executed by the at least one processing circuit, cause the at least one processing circuit to:
   determine a thematic trend of the first dataset based on an amount of text records of the first subset exceeding a trend threshold; and
   wherein the thematic trend includes one or more of:
   a seasonal trend determined based on the first subset having an amount of records within a predetermined date range that exceeds the trend threshold;
   a source trend determined based on the first subset having an amount of records from the same source that exceeds the trend threshold;
   a product trend determined based on the first subset having an amount of records associated with the same product that exceeds the trend threshold;
   a location trend determined based on the first subset having an amount of records form the same location that exceeds the trend threshold; and
   a provider trend determined based on the first subset having an amount of records associated with the same provider employee that exceeds the trend threshold.

18. The non-transitory computer-readable medium of claim 16, wherein the medium further stores instructions that, when executed by the at least one processing circuit, cause the at least one processing circuit to:

apply the classifier of the semi-supervised machine learning text model to generate, for each complaint record in the first dataset, a training category score;
assign a training disposition to each past text record based on the training category score;
determine whether the past disposition is different from the training disposition;
modify the model based on the past disposition being different from the training disposition such that the model more accurately determines a correct categorical label; and
generate a training report comprising the training dataset, the past disposition, the training disposition, and an indication of whether the past disposition is different from the training disposition.

* * * * *